United States Patent [19]

Wang

[11] Patent Number: 4,702,441

[45] Date of Patent: Oct. 27, 1987

[54] AIRCRAFT WING STALL CONTROL DEVICE AND METHOD

[75] Inventor: Timothy Wang, Bellevue, Wash.

[73] Assignee: The Boeing Company, Seattle, Wash.

[21] Appl. No.: 687,599

[22] Filed: Dec. 31, 1984

[51] Int. Cl.$^4$ .............................................. B64C 21/08
[52] U.S. Cl. .................................... 244/204; 244/213;
244/214; 244/210
[58] Field of Search ............... 244/198, 199, 200, 204,
244/213, 214, 210, 211

[56] References Cited

U.S. PATENT DOCUMENTS

| | | | |
|---|---|---|---|
| 2,037,626 | 4/1936 | Hall | 244/214 |
| 2,041,793 | 5/1936 | Stalker . | |
| 2,549,045 | 4/1951 | Ashkenas . | |
| 2,694,357 | 11/1954 | Lee . | |
| 2,885,161 | 5/1959 | Kerker et al. . | |
| 2,973,925 | 3/1961 | Wiele | 244/214 |
| 3,139,248 | 6/1964 | Alvarez-Calderon . | |
| 3,144,220 | 8/1964 | Kittelson . | |
| 3,370,810 | 2/1968 | Shevell et al. . | |
| 3,486,720 | 12/1969 | Seglem et al. | 244/210 |
| 3,525,486 | 8/1970 | Wimpenny . | |
| 3,774,867 | 11/1973 | Quinn . | |
| 4,032,087 | 6/1977 | Cleaves . | |
| 4,042,191 | 8/1977 | Johnson . | |
| 4,334,658 | 6/1982 | Mackenzie | 244/213 |

FOREIGN PATENT DOCUMENTS 704742  4/1941  Fed. Rep. of Germany ...... 244/214

*Primary Examiner*—Galen Barefoot
*Attorney, Agent, or Firm*—Hughes & Cassidy

[57] ABSTRACT

A swept wing having a leading edge flap which in its deployed position forms a slot with the forward end portion of the wing. An elongate strip is positioned on the forward portion of the wing in a manner that when the flap is deployed to form the slot, this strip protrudes into the airstream that passes upwardly through the slot. This creates a stall condition in the area of the strip to produce the desired pitch characteristics for safe recovery from stall. In the cruise configuration, where the flap is positioned against the leading edge of the wing, this strip is aerodynamically concealed.

20 Claims, 9 Drawing Figures

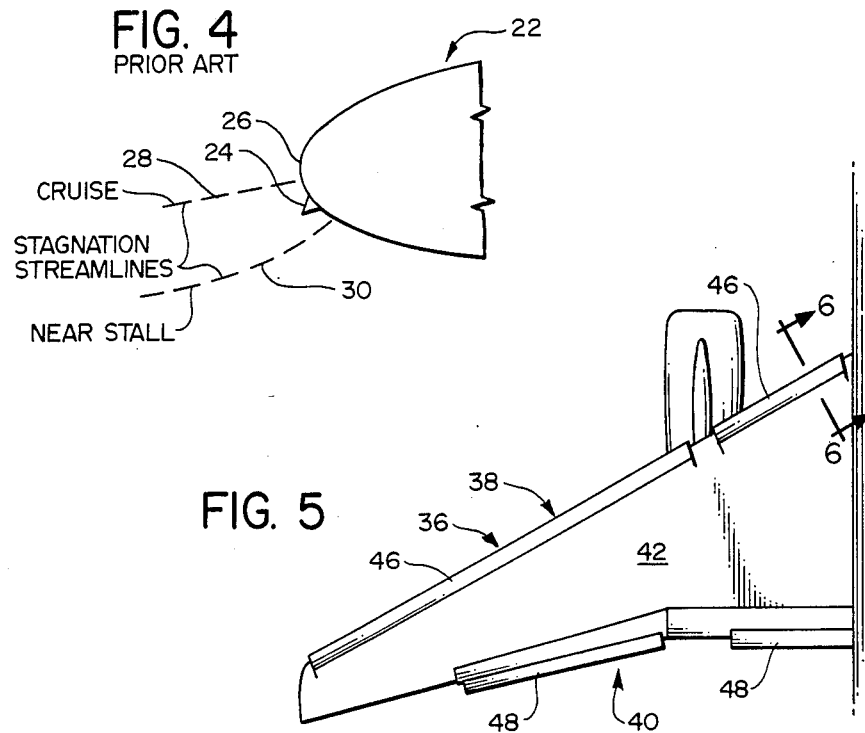
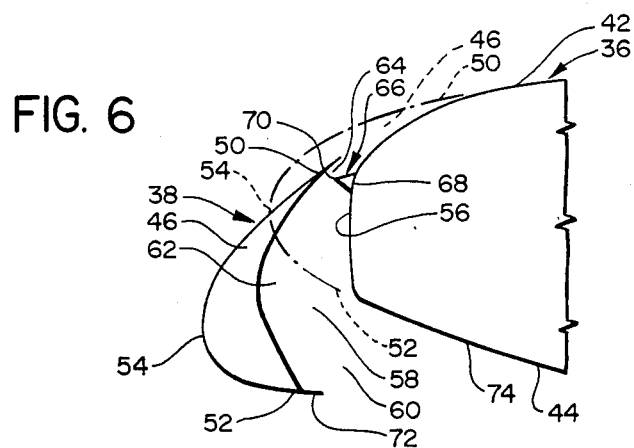

AIRCRAFT WING STALL CONTROL DEVICE AND METHOD

BACKGROUND OF THE INVENTION

1. Field of the Invention

The invention relates generally to a device and method to affect aero-dynamic flow over a wing to create desired stall patterns as a means of avoiding adverse pitching moments.

2. Background Art

In general, the stall pattern on an aircraft wing must be tailored to produce the desired pitch characteristics for safe recovery from stall. This is particularly critical for a swept wing aircraft with high lift devices. Quite commonly, as the angle of attack increases, the wing will first stall at the outboard area of the wing, thus destroying the lifting force that is contributed at a more rearward location. This would tend to move the center of lift forward, thus creating a pitching moment that would tend to lift the nose of the aircraft upwardly. This creates an unstable situation where the pitching moment produces an increase in angle of attack. In the case of a piloted airplane, when such a condition is reached, the airplane will pitch towards stall without any pilot input. This unstable condition persists over a range of angle of attack until a stall condition is developed also at a more inboard location, thus eliminating the upward pitching moment and causing the aircraft nose to move downwardly. In general, it is more desirable that the onset of stall occur in a pattern that alleviates abrupt changes in pitching moments and in particular eliminate the abrupt onset of an upward pitching moment and overall creates desired pitch characteristics for safe recovery from stall.

One approach to this problem was incorporated on early DC 9 designs, where the inboard leading edge of the wing was provided with a stall strip that extended along a lower part of the leading edge. In cruise mode, the stagnation point on the leading edge would be slightly above the stall strip so that it would not disturb flow over the wing. However, at higher angles of attack, the stagnation point would move to a location beneath the stall strip so that flow upwardly over the wings would be disturbed in that area so as to promote stall over the inboard area of the wing. However, there was the penalty of increased cruise drag.

A search of the patent literature has disclosed a number of patents which are discussed briefly below. These are the following.

U.S. Pat. No. 2,041,793, Stalker, illustrates a slotted wing configuration where vortex generating devices are located in the slot so as to energize the air and increase lift created by the air passing through the slot.

U.S. Pat. No. 2,549,045, Ashkenas, is directed toward the problem of controlling wingtip stall in airplanes. There is a slot in the tip portion which opens to delay stall.

U.S. Pat. No. 2,694,357, Lee, illustrates the use of vortex generators to energize air going into an inlet so as to maximize recovery of energy.

U.S. Pat. No. 2,885,161, Kerker, et al., shows the use of wing fences to control stall in an aircraft wing.

U.S. Pat No. 3,139,246, Alvarez-Calderon, shows various devices to vary the area, span, camber or thickness of a wing.

U.S. Pat. No. 3,144,220, Kittelson, illustrates a retractable cover members on the upper surface of a wing. These are moved upwardly into the airstream for gust load alleviation so as to destroy lift.

U.S. Pat. No. 3,370,810, Chevell, et al., shows a stall control device for a swept-wing aircraft. There are vortex generating devices positioned on the under surface of the wing. These are intended to avoid blocking of air movement on the upper wing surface while still functioning to create vortex air currents which flow opposite to the direction of the lateral air movement in the boundary layer, thereby countering such movement.

U.S. Pat. No. 3,525,486, Wimpenny, illustrates the use of vortex generators in a blown slot that directs air upwardly over the upper surface of the wing.

U.S. Pat. No. 3,774,867, Quinn, is intended to delay the onset of wing stall. There is a plurality of acoustic generators positioned in the forward portion of the upper surface of the wing.

U.S. Pat. No. 4,032,087, Cleaves, shows a leading edge spoiler which has a generally semi-circular configuration. In one position, the surface of the spoiler lies flush with the aerodynamic surface of the wing, and can be rotated to move into the flow pattern of the wing.

U.S. Pat. No. 4,042,191, Johnson, shows a device to improve the sealing of a gap in a Krueger flap. This is a spring loaded device which is moved by air pressure into sealing engagement.

In view of the foregoing, it is an object of the present invention to provide a apparatus and method for tailoring the stall pattern in a wing so as to avoid adverse pitching moments, this being accomplished in a manner to minimize any drag penalties. Other objects and advantages of present invention will become apparent from the following description.

SUMMARY OF THE INVENTION

The present invention is utilized in a wing of an aircraft where the wing comprises a main wing structure having an upper aerodynamic surface, a lower aerodynamic surface, and a forward surface portion that extends upwardly toward said upper aerodynamic surface.

The wing has a leading edge member which is movable between a stowed position for cruise mode where the device aerodynamically conceals the surface of the main wing structure and a deployed position for highlift mode where the device forms with the forward surface portion of the main wing structure a slot for passage of air upwardly therethrough and over the upper wing surface.

The wing is characterized in that within a predetermined range of high angles of attack and with the leading edge member deployed, there is an aerodynamic condition of initial stall at a first spanwise location of the wing, without a corresponding pattern of stall developing at a second spanwise location of the wing, with the aerodynamic condition producing an undesired pitching moment.

The improvement of the present invention comprises a flow disturbing means positioned at the slot at the second spanwise location. The flow disturbing means is positioned so that with the leading edge member in its stowed position, the flow disturbing means is aerodynamically concealed by the leading edge member. With the leading edge member in its deployed position, the flow disturbing means is exposed aerodynamically to airflow in the slot to disturb the airflow that proceeds upwardly through the slot and over the wing, so as to create a disturbance which creates a desired stall condition at said second location.

In the preferred embodiment, the wing is a swept wing, and with the wing swept outwardly in a rearward direction, the first spanwise location is at an outboard location of the wing, and the flow disturbing means is mounted at an inboard location of the wing. In the preferred form, the flow disturbing means is mounted to the front surface portion of the main wing structure.

In one embodiment, the flow disturbing means comprises a device that has a first retracted position where the device is positioned to have a lesser disturbing effect on airflow through the slot, and an outwardly deployed position where the device has a greater disturbing effect on airflow through the slot. There is means responsive to airflow through the slot to deploy the device in its flow disturbing position when there is greater airflow through the slot. In this specific embodiment, there is spring means arranged to urge the device toward its retracted position, with the device having a surface exposed to airflow through the slot, with a reduction of static pressure in air flowing through the slot acting against the spring means to move the device from its retracted position to its flow disturbing position.

In two other embodiments, the flow disturbing means comprises a fixed member that is fixedly mounted to the front surface portion of the main wing structure.

In a preferred form, the flap forms a slot that converges in cross-sectional area in an upward direction of airflow so as to have a narrower high velocity area closer to an upper exit area of the slot. The flow disturbing means comprises a member positioned at said high velocity flow area to optimize the disturbing effect of the device on the airflow through the slot.

In the method of the present invention, a flow disturbing means is provided as described above. For cruise mode, the leading edge member remains in its stowed position to aerodynamically conceal the flow disturbing means. For highlift operation, the leading edge member is deployed to aerodynamically expose the flow disturbing means.

Other features become apparent from the following detailed description.

BRIEF DESCRIPTION OF THE DRAWINGS

FIG. 4 is a sectional view taken through Line 4—4 of FIG. 3, and further illustrating the stagnation points relative to the stall strip during a cruise and high lift angle of attack conditions;

FIG. 5 is a top plan view of a swept wing incorporating the present invention;

FIG. 6 is a sectional view taken on Line 6—6 of FIG. 5;

DESCRIPTION OF THE PREFERRED EMBODIMENTS

Figure 1:
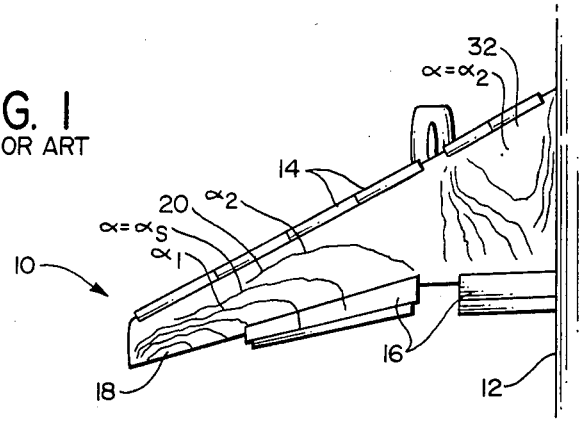
FIG. 1 is a top plan view of a swept wing in an aircraft, illustrating the pattern of growth of outboard wing stall with increasing angle of attack, and also illustrating a desired pattern of growth of wing stall at a forward inboard location.

With reference to FIG. 1, there is shown a typical prior art swept wing 10 of an aircraft, with the side surface of the fuselage of the aircraft being indicated at 12. The wing 10 has a set of leading edge flaps or slats 14, and also a set of trailing edge flaps 16, both sets being shown in their outwardly deployed, high-lift positions.

Figure 2A:
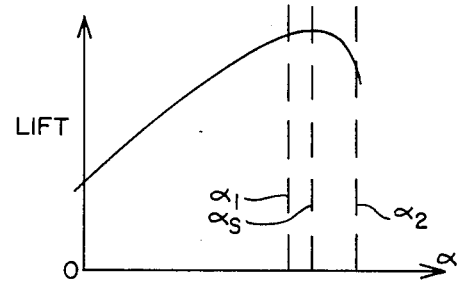
FIGS. 2a and 2b are two graphs plotting lift and pitching moment, respectively, against the angle of attack of the wing.
Figure 2B:
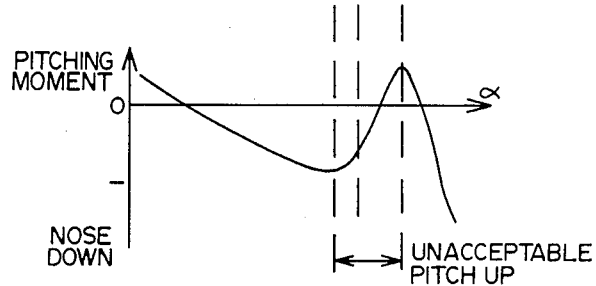

To discuss the characteristics of the wing 10 for varying angles of attack, reference is made to the graphs of FIGS. 2a and 2b. It can be seen from the graph of FIG. 2a that the lift coefficient increases relatively uniformly up until it reaches an angle of attack Alpha ($\alpha$) 1. The rate of increase diminishes between Alpha ($\alpha$) 1 and Alpha ($\alpha$) S. As the angle of attack increases further between Alpha ($\alpha$) S and Alpha ($\alpha$) 2, the wing is beginning to stall more severely and the lift coefficient is decreasing.

With reference now to FIG. 2b, it can be seen that as the angle of attack increases towards Alpha ($\alpha$) 1, the pitching moment becomes more negative and the airplane is considered stable in pitch. As Alpha ($\alpha$) 1 is approached stability diminishes and reaches zero at Alpha ($\alpha$) 1. Between the angle of attack Alpha ($\alpha$) 1 and angle of attack Alpha ($\alpha$) 2, the pitching moment became more nose up with increasing angle of attack leading to an unstable situation (i.e., the airplane has an inherent tendency to stall once Alpha ($\alpha$) 1 is exceeded.

To relate the values illustrated in the graphs of FIGS. 2a and 2b to the growth of stall patterns shown in FIG. 1, as the angle of attack begins to increase, the outboard stall initially begins at a location 18 that is near the wing tip at the trailing edge upper surface. As the angle of attack increases, the boundaries of the area of stall migrate a moderate degree forward and also inboard, with the expanded stall area being indicated at 20. It can readily be appreciated that as the outboard area of stall increases from location 18 to location 20, the lift contributed by the outboard wing portion diminishes sharply. Thus, if there is no corresponding stall condition at the inboard area of the wing which will continue to generate more lift with increasing angle of attack, the wing will experience a severe pitch-up moment, and this is illustrated in the graph of FIG. 2b. The obvious disadvantage of this abrupt pitch-up is that it degrades the ability to control the airplane in that when the wing reaches a near-stall condition, there is an abrupt upward pitching moment that would tend to increase angle of attack to bring the wing closer to a full stall condition. Even then, when the aircraft begins to recover from the stall by decreasing the angle of attack, the aircraft again goes through this phase of having an abrupt pitching moment opposing the recovery when it moves through the angle of attack Alpha ($\alpha$) 2 towards Alpha ($\alpha$) 1 in the graphs of FIGS. 2a and 2b. As angle of attack increased beyond Alpha ($\alpha$) 2, stall occurs over area 32 in FIG. 1 causing increasing nose down pitching moment and further lift loss.

Figure 3:
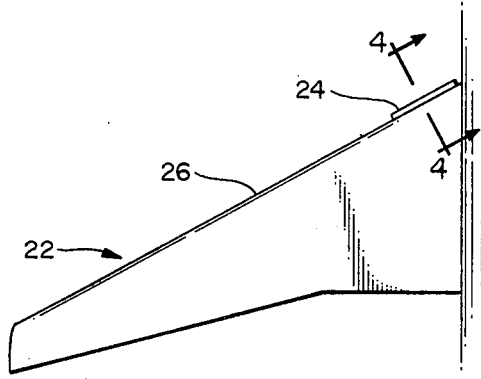
FIG. 3 is a top plan view of a prior art device for alleviating adverse pitching moments resulting from outboard wing stall.

One prior approach to alleviate this problem is illustrated in the wing 22 illustrated in FIGS. 3 and 4. At the inboard leading edge portion of the wing 22, there is mounted a stall strip 24 having its length-wise access parallel to the wing leading edge 26. This strip 24 has a general triangular configuration, with the pointed edge of the triangle extending outwardly from the leading edge 26. This strip 24 is positioned on the lower portion of the leading edge 26 so that in cruise mode, the strip 24 is positioned below the stagnation streamline 28. However, when the wing 22 is operating at a higher angle of attack, so as to be close to a stall condition, the stagnation streamline moves downwardly to a location at 30, which is below the location of the stall strip 24. Thus, there is an upward flow of air over the stall strip 24, with the strip 24 disrupting this airflow. This disruption of airflow creates a stall condition over the inboard section of the wing. With reference to FIG. 1, in this case the initial areas of stall are at 20 and 32 as illustrated. Although the outboard wing stall region grows with increasing angle of attack, stall at 32 grows simultaneously with the stall at 20 so as to prevent the unstable pitch characteristics described in FIG. 2.

In the prior art arrangement of FIGS. 3 and 4, there is of course the consideration of locating and sizing the stall strip so that the pattern of the growth of the inboard stall is properly achieved. Further, there is the obvious disadvantage that the presence of this stall strip 24 creates a drag penalty during cruise due to disturbance of the lower surface flow.

Another prior art approach has been simply to tailor the leading edge high-lift devices at the inboard wing section so that the inboard wing stalls at a lesser angle of attack than the outboard wing. However, this creates a penalty with respect to the maximum lift which can be achieved.

It is with the foregoing considerations in mind that the present invention was created.

Consider a swept wing incorporating a full span gapped slat for high lift. Such a configuration often suffers from excessive pitchup near stall as described earlier with reference to FIG. 1, although its maximum co-efficient of lift capability would be excellent. For practical reasons, it would not be cost effective to replace portions of the gapped slot by a less powerful device such as a sealed slat or Krueger flap. The present invention offers a means to degrade the effectiveness of the gapped slot locally to an extent sufficient to produce acceptable pitch characteristics near stall without giving up any maximum co-efficient of lift.

To describe the apparatus of the present invention, reference is made to FIGS. 5 and 6. There is shown a wing 36 having a leading edge 38, a trailing edge 40, an upper surface 42 and a lower surface 44. At the leading edge 38 and at the trailing edge 40, there are high-lift devices in the form of slats 46 at the leading edge 38 and trailing edge flaps 48. The leading edge device is shown rather schematically in FIG. 6, and it is to be understood that there would be provided suitable actuating and linkage mechanisms to move the leading edge slat 46 between its stowed position (shown in broken lines in FIG. 6) and its deployed position (shown in full lines in FIG. 6).

The slat 46 has an upper rear edge portion 50 which in the stowed position blends into the aerodynamic contour of the upper surface 42. The slat 46 also has a lower rear edge portion 52, which in the stowed position of the slat 46 blends aerodynamically into the lower wing surface of 44. In the stowed position, the forward surface 54 of the slat 46 forms the leading edge surface of the wing. Thus, in its stowed position the slat 46 covers or aerodynamically conceals the forward surface 56 of the main wing structure.

When the slat 46 is moved downwardly and outwardly to its deployed position, it forms with the forward wing surface 56 a slot 58 which has a lower entry portion 60, an upwardly convergent central portion 62, and a relatively narrow upper throat portion 64 from which the air flowing through the slot 60 passes over the upper portion of the wing forward surface 56 and continues on over the main upper wing surface 42.

The stall control device of the present invention is generally designated 66, and is shown somewhat schematically as an elongated strip having in this particular embodiment a generally triangular cross sectional configuration, with one side of the triagular providing a mounting surface 68, and the other two sides of the triangle providing convergent surfaces leading toward a forwardly extending point 70, which is a relatively sharp edge extending along the length of the control strip 66. The precise configuration of the strip 66 is not critical, but it should be configured and arranged to produce sufficient flow disturbance to achieve the desired stall conditions.

With the stall control strip 66 being mounted to the forward surface 56 of the main wing portion, when the leading edge slat 46 is in its stowed position, the stall control strip 66 is totally concealed. However, when the slat of 46 moves downwardly and outwardly to its deployed position, the stall control strip 66 becomes aerodynamically exposed and is positioned in the flow pattern through the slot 58. More specifically, in the preferred arrangement shown herein, this stall control strip 66 is located at the throat portion 64 of the slot 58, where the velocity of air flow through the slot 58 is greatest.

To review the operation of the stall control device 66 of the present invention, obviously, in the cruise configuration where the slat 46 is stowed, the stall control device has no aerodynamic effect on the operation of the wing 36. With the slat 46 in its deployed position, as shown in the full lines of FIG. 6, at relatively low angles of attack, there is a relatively small amount of flow through the slot 58. However, as the angle of attack increases, the stagnation point on the slat 46 and also on the surface of the main wing move rearwardly to, for example, the locations indicated at 72 and 74, respectively. During high-lift mode of operation, there is substantially greater air flow through the slot 58 and thus the stall control device 66 has a greater effect in disturbing the air flow through the slot 58 and thus disturb the overall air flow over the upper wing surface 42 at a location rearwardly of the stall control device 66. Since the stall control device 66 is aerodynamically hidden during the cruise configuration, this gives the designer greater freedom in locating and shaping the device 66 so as to optimize its pattern of generating stall so that it can more closely match the stall pattern that develops at the outboard location of the wing.

Figure 7:
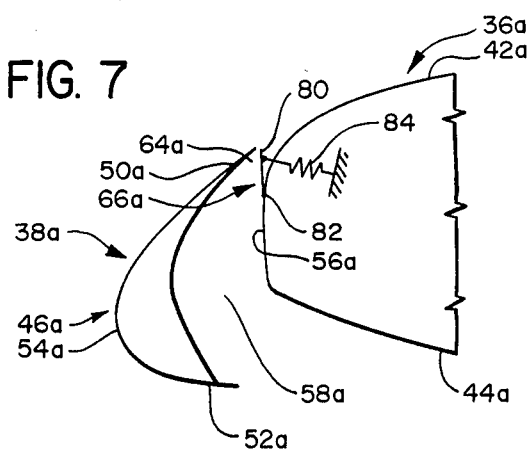
FIG. 7 is a view similar to FIG. 6, but showing a second embodiment of the present invention.

A second embodiment of the present invention is illustrated in FIG. 7. Components which are similar to the first embodiment of FIGS. 5 and 6 are given light numerical designations, with an "a" suffix distinguishing those of the second embodiment. Thus, there is the wing 36a having the leading edge 38a, upper surface 42a and lower surface 44a. The leading edge slat 46a has its upper and lower rear edges 50a and 52a and a forward surface portion 54a. The forward surface 56a forms with the slat 46a the slot 58a.

The stall control device 66a comprises an elongate plate or strip 80 pivotally or swing-mounted by its lower edge at 82. This strip 80 is urged by a tension spring (shown rather schematically at 84) toward its closed position where it lies flush against the forward surface 56a *of the main wing structure. However, as flow through the slot 58 increases in velocity, the reduction of air pressure resulting from the high velocity flow through the throat portion 64a* overcomes the force of the spring 84 to pull the strip 80 outwardly into the air stream passing upwardly through the slot 58a. Thus, the size and location of the strip 80, and also the strength of the restraining spring 84, can be selected so that there is the appropriate aerodynamic disturbance to generate inboard stall in the appropriate pattern to match the pattern of growth of stall at the inboard location. Further, it is to be recognized that other mechanisms could be used to deploy this strip 80, and such mechanisms could be made responsive to flow conditions through the slot 58 in some manner.

Figure 8:
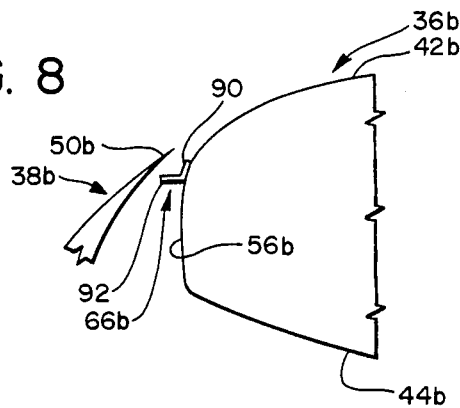
FIG. 8 is a view similar to FIG. 6 and FIG. 7, but showing a third embodiment of the present invention.

A third embodiment of the present invention is shown in FIG. 8. Components of this third embodiment which correspond to components of the first embodiment will be given light in numerical designations, with a "b" suffix distinguishing those of the third embodiment. Thus, there is a wing 36b having a leading edge 38b, upper surface 42b and a lower surface 44b. For ease of illustration, only the upper rear edge portion 50b of the slat 46b is shown. The stall control device 66b comprises a mounting flange 90 attached to the upper part of the wing surface 56b. The device 66b further comprises a forwardly extending flange 92. As shown herein, this flange 92 has a generally planar configuration and is shaped as an elongate rectangular piece extending across a portion of the leading edge of the wing surface 56b. Aerodynamically, this device 66b functions in substantially the same manner as the devices 66a and 66.

It is to be understood that the stall control devices 66, 66a and 66b have been shown somewhat schematically herein, and the depicted arrangement could be optimized to produce the desired aerodynmic effects. Further, various modifications could be made without departing from the full scope of the teachings of the present invention.

What is claimed is:

1. In a wing of an aircraft, where the wing comprises:
   (a) a main wing structure having an upper aerodynamic surface, a lower aerodynamic surface, and a forward surface portion that extends upwardly toward said upper aerodynamic surface;
   (b) a leading edge member which is moveable between a stowed position for cruise mode where the device aerodynamically conceals the surface of the main wing structure, and a deployed position for high-lift mode where the device forms with the forward surface portion of the main wing structure a slot for passage of air upwardly therethrough and over the wing upper surface;
   (c) said wing being characterized in that within a predetermined range of high angles of attack and with the leading edge member deployed, there is an aerodynamic condition of initial stall at a first spanwise location of the wing, without a corresponding pattern of stall developing at a second spanwise location of the wing, with said aerodynamic condition producing an undesired pitching moment;

the improvement comprising a flow disturbing means positioned at said slot at said second spanwise location in a manner that with the leading edge member in said stowed position, the flow disturbing means is aerodynamically concealed by the leading edge member, and with the leading edge member in its deployed position, said flow disturbing means is exposed aerodynamically to antiflow in said slot to disturb the airflow that proceeds upwardly through said slot and over said wing, so as to create a disturbance which creates a desired stall condition at said second location.

2. The improvement as recited in claim 1, wherein said wing is a swept wing, and said first spanwise location is at an outboard location of the wing, and said flow disturbing means is mounted at an inboard location of said wing.

3. The improvement as recited in claim 2, wherein said flow disturbing means is mounted to the front surface portion of the main wing structure.

4. The improvement as recited in claim 2, wherein said flow disturbing means comprises a device that has a first retracted position where the device is positioned to have a lesser disturbing effect on airflow through the slot, and an outwardly deployed position where said device has a greater disturbing effect on airflow through the slot, said improvement further comprising means responsive to airflow through the slot to deploy said device in its flow disturbing position when there is greater airflow through the slot.

5. The improvement as recited in claim 4, wherein said device deploying means comprises spring means arranged to urge said device towards its retracted position, with said device having a surface exposed to air flow through said slot, with a reduction of static pressure in air flowing through the slot acting against said spring means to move the device from its passive position to its flow disturbing position.

6. The improvement as recited in claim 2, wherein said flow disturbing means comprises a fixed member that is fixedly mounted to the front surface portion of the main wing structure.

7. The improvement as recited in claim 2, wherein said flap forms a slot that converges in cross-sectional area in an upward direction of air flow so as to have a narrower high velocity area closer to an upper exit area of the slot, said flow disturbing means comprising a member positioned at said high velocity flow area so as to optimize disturbing effect of the device on the air flow through the slot.

8. The improvement as recited in claim 1, wherein said flow disturbing means is mounted to the front surface portion of the main wing structure.

9. The improvement as recited in claim 1, wherein said flow disturbing means comprises a device that has a first retracted position where the device is positioned to have a lesser disturbing effect on airflow through the slot, and an outwardly deployed position where said device has a greater disturbing effect on airflow through the slot, said improvement further comprising means responsive to airflow through the slot to deploy said device in its flow disturbing position when there is greater airflow through the slot.

10. The improvement as recited in claim 9, wherein said device deploying means comprises spring means arranged to urge said device towards its retracted position, with said device having a surface exposed to air flow through said slot, with a reduction of static pressure in air flowing through the slot acting against said spring means to move the device from its passive position to its flow disturbing position.

11. The improvement as recited in claim 1, wherein said flow disturbing means comprises a fixed member that is fixedly mounted to the front surface portion of the main wing structure.

12. The improvement as recited in claim 1, wherein said flap forms a slot that converges in cross-sectional area in an upward direction of air flow so as to have a narrower high velocity area closer to an upper exit area of the slot, said flow disturbing means comprising a member positioned at said high velocity flow area so as to optimize disturbing effect of the device on the air flow through the slot.

13. In a wing of an aircraft, where the wing comprises:
   (a) a main wing structure having an upper aerodynamic surface, a lower aerodynamic surface, and a forward surface portion that extends upwardly toward said upper aerodynamic surface;
   (b) a leading edge member which is moveable between a stowed position for cruise mode where the device aerodynamically conceals the surface of the main wing structure, and a deployed position for high-lift mode where the device forms with the forward surface portion of the main wing structure a slot for passage of air upwardly therethrough and over the wing upper surface;
   (c) said wing being characterized in that within a predetermined range of high angles of attack and with the leading edge member deployed, there is an aerodynamic condition of initial stall at or first spanwise location of the wing, without a corresponding pattern of stall developing at a second spanwise location of the wing, with said aerodynamic condition producing an undesired pitching moment;
a method of alleviating said undesired pitching moment, said method comprising:
   a. providing a flow disturbing merans positioned at said slot and said second spanwise location;
   b. positioning the leading edge member in said stowed position so that the flow disturbing means is aerodynamically concealed by the leading edge member;
   c. positioning the leading edge member in its deployed position so that said flow distrubing means is exposed aerodynamically to airflow in said slot to disturb the airflow that proceeds upwardly through said slot and over said wing, so as to create a disturbance which creates a desired stall condition at said second location.

14. The method as recited in claim 13, wherein said wing is a swept wing, and said first spanwise location is at an outboard location of the wing, and said flow disturbing means is mounted at an inboard location of said wing.

15. The method as recited in claim 14, wherein said flow disturbing means is mounted to the front surface portion of the main wing structure.

16. The method as recited in claim 14, wherein said flow disturbing means comprises a fixed member that is fixedly mounted to the front surface portion of the main wing structure.

17. The method as recited in claim 14, wherein said flap forms a slot that converges in cross-sectional area in an upward direction of air flow so as to have a narrower high velocity area closer to an upper exit area of the slot, said flow disturbing means comprising a member positioned at said high velocity flow area so as to optimize disturbing effect of the device on the air flow through the slot.

18. The method as recited in claim 13, wherein said flow disturbing means is mounted to the front surface portion of the main wing structure.

19. The method as recited in claim 13, wherein said flow disturbing means comprises a fixed member that is fixedly mounted to the front surface portion of the main wing structure.

20. The method as recited in claim 13, wherein said flap forms a slot that converges in cross-sectional area in an upward direction of air flow so as to have a narrower high velocity area closer to an upper exit area of the slot, said flow disturbing means comprising a member positioned at said high velocity flow area so as to optimize disturbing effect of the device on the air flow through the slot.

* * * * *